(12) United States Patent
Xu et al.

(10) Patent No.: US 7,030,878 B2
(45) Date of Patent: Apr. 18, 2006

(54) METHOD AND APPARATUS FOR GENERATING A SHADOW EFFECT USING SHADOW VOLUMES

(75) Inventors: Jiangming Xu, San Jose, CA (US); Wen-Chung Chen, Cupertino, CA (US); Yuanfeng Wang, Shanghai (CN); Liang Li, Shanghai (CN); John Brothers, Calistoga, CA (US); Boris Prokopenko, Milpitas, CA (US)

(73) Assignee: VIA Technologies, Inc., Taipei (TW)

( * ) Notice: Subject to any disclaimer, the term of this patent is extended or adjusted under 35 U.S.C. 154(b) by 165 days.

(21) Appl. No.: 10/804,862

(22) Filed: Mar. 19, 2004

(65) Prior Publication Data

US 2005/0206647 A1   Sep. 22, 2005

(51) Int. Cl.
  *G06T 15/40*  (2006.01)
  *G06T 9/00*   (2006.01)
  *G06F 13/00*  (2006.01)

(52) U.S. Cl. .................. 345/422; 345/536; 345/555

(58) Field of Classification Search ............. 345/536, 345/530, 555–557, 563, 422, 421, 418, 419; 711/144, 118, 119
  See application file for complete search history.

(56) References Cited

U.S. PATENT DOCUMENTS

| 6,252,608 | B1 * | 6/2001 | Snyder et al. | 345/473 |
| 6,384,822 | B1 * | 5/2002 | Bilodeau et al. | 345/422 |
| 6,557,083 | B1 * | 4/2003 | Sperber et al. | 711/144 |
| 6,798,421 | B1 * | 9/2004 | Baldwin | 345/557 |
| 2004/0169651 | A1 * | 9/2004 | Everitt et al. | 345/426 |

OTHER PUBLICATIONS

"Real-Time Shadow Generation Using BSP Trees and Stencil Buffers" Batagelo et al.
"Stencil Shadow Volumes" Dahlbom; Spring 2002.
"Practical and Robust Stenciled Shadow Volumes for Hardware-Accelerated Rendering" Everitt et al.; 2002.
"Shadow Volumes on Programmable Graphics Hardware" Brabec et al.; 2003.

* cited by examiner

Primary Examiner—Kee M. Tung
Assistant Examiner—J. Hsu
(74) Attorney, Agent, or Firm—Thomas, Kayden, Horstemeyer & Risley

(57) ABSTRACT

The computer graphics system is configured to generate a shadow effect with a stencil shadow volume method using a combination of compressed and uncompressed stencil buffers in coordination with compressed and uncompressed depth data buffers. An uncompressed stencil buffer is capable of storing stencil shadow volume data for each pixel and a compressed stencil buffer is capable of storing stencil shadow volume data for a group of pixels.

30 Claims, 13 Drawing Sheets

TWO DIMENSIONAL
REPRESENTATION OF SHADOW
VOLUMES

SL1 PRE-PROCESS SEQUENCE

METHOD AND APPARATUS FOR GENERATING A SHADOW EFFECT USING SHADOW VOLUMES

FIELD OF THE INVENTION

The present invention generally relates to computer graphics systems, and more particularly to a method and apparatus for generating a shadow effect using a shadow volumes approach.

BACKGROUND OF THE INVENTION

As is known, the art and science of three-dimensional ("3-D") computer graphics concerns the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a polygon.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, wherein the output from a prior stage serves as the input for a subsequent stage. In the context of a graphics processor, these stages include, for example, pervertex operations, primitive assembly operations, pixel operations, texture assembly operations, rasterization operations, and fragment operations.

In a typical graphics display system, an image database (e.g., a command list) may store a description of the objects in the scene. The objects are described with a number of small polygons, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.), as well as possibly the normal vectors to the surface at each vertex. For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic eliminates the polygons (i.e., triangles) which are outside the viewing area and "clips" the polygons, which are partly inside and partly outside the viewing area. These clipped polygons will correspond to the portion of the polygon inside the viewing area with new edge(s) corresponding to the edge(s) of the viewing area. The polygon vertices are then transmitted to the next stage in coordinates corresponding to the viewing screen (in X, Y coordinates) with an associated depth for each vertex (the Z coordinate). In a typical system, the lighting model is next applied taking into account the light sources. The polygons with their color values are then transmitted to a rasterizer.

For each polygon, the rasterizer determines which pixel positions the polygon and attempts to write the associated color values and depth (Z value) into frame buffer cover. The rasterizer compares the depth values (Z) for the polygon being processed with the depth value of a pixel, which may already be written into the frame buffer. If the depth value of the new polygon pixel is smaller, indicating that it is in front of the polygon already written into the frame buffer, then its value will replace the value in the frame buffer because the new polygon will obscure the polygon previously processed and written into the frame buffer. This process is repeated until all of the polygons have been rasterized. At that point, a video controller displays the contents of a frame buffer on a display a scan line at a time in raster order.

With this general background provided, reference is now made to FIG. 1, which shows a functional flow diagram of certain components within a graphics pipeline in a computer graphics system. It will be appreciated that components within graphics pipelines may vary from system, and may also be illustrated in a variety of ways. As is known, a host computer 10 (or a graphics API running on a host computer) may generate a command list 12, which comprises a series of graphics commands and data for rendering an "environment" on a graphics display. Components within the graphics pipeline may operate on the data and commands within the command list 12 to render a screen in a graphics display.

In this regard, a parser 14 may retrieve data from the command list 12 and "parse" through the data to interpret commands and pass data defining graphics primitives along (or into) the graphics pipeline. In this regard, graphics primitives may be defined by location data (e.g., x, y, z, and w coordinates) as well as lighting and texture information. All of this information, for each primitive, may be retrieved by the parser 14 from the command list 12, and passed to a vertex shader 16. As is known, the vertex shader 16 may perform various transformations on the graphics data received from the command list. In this regard, the data may be transformed from World coordinates into Model View coordinates, into Projection coordinates, and ultimately into Screen coordinates. The functional processing performed by the vertex shader 16 is known and need not be described further herein. Thereafter, the graphics data may be passed onto rasterizer 18, which operates as summarized above.

Thereafter, a z-test 20 is performed on each pixel within the primitive being operated upon. As is known, comparing a current z-value (i.e., a z-value for a given pixel of the current primitive) in comparison with a stored z-value for the corresponding pixel location performs this z-test. The stored z-value provides the depth value for a previously rendered primitive for a given pixel location. If the current z-value indicates a depth that is closer to the viewer's eye than the stored z-value, then the current z-value will replace the stored z-value and the current graphic information (i.e., color) will replace the color information in the corresponding frame buffer pixel location (as determined by the pixel shader 22). If the current z-value is not closer to the current viewpoint than the stored z-value, then neither the frame buffer nor z-buffer contents need to be replaced, as a previously rendered pixel will be deemed to be in front of the current pixel.

Again, for pixels within primitives that are rendered and determined to be closer to the viewpoint than previously-stored pixels, information relating to the primitive is passed on to the pixel shader 22 which determines color information for each of the pixels within the primitive that are determined to be closer to the current viewpoint. Color information includes whether or not pixels are within a shadow. As known in the prior art, one method for determining shadowed regions in a scene is through the use of shadow volumes.

Reference is now made to FIG. 2, which illustrates a shadow volume approach of generating a shadow effect in a computer graphics system. The shadow volume 34, as is known, defines the space in the shadow of a particular occluder 32 for a particular light source 30. Each polygon facing a light source 30 is an occluder 32 and therefore generates a shadow volume 34. A pixel 38 that falls within a shadow volume is rendered as being located in a shadow. The shadow volume method determines whether a pixel 38, 39 falls within a shadow volume 34 by counting the number times the ray 35 between the pixel 38, 39 and the viewer 36 enter 33 and exit 37 shadow volumes 34. If the number of times a ray enters 33 shadow volumes 34 is the same as the number of times the ray exits 37 shadow volumes 34 then the pixel 38, 39 is not in a shadow. For example, the ray 35 from the viewer 36 to pixel A 38 has one entry 33 into the shadow volume 34 and no exits 37 from the shadow volume 34. Thus, pixel A 38 is in a shadow. Similarly, since the ray 35 from the viewer 36 to pixel B 39 enters 33 the shadow volume 34 one time and exits 37 the shadow volume 34 one time, pixel B 39 is not in a shadow.

Since the ray tracing technique is very time consuming, especially with multiple occluders and multiple light sources, the stencil shadow volume method simplifies the operation by performing a simple in/out counting method using the stencil buffer. Whether the pixel is in the shadow is determined by performing a z-test on the front-facing and back-facing polygons of shadow volumes relative to either the viewer or a maximum depth plane. For example, in one implementation of the stencil shadow volume approach, the stencil buffer value would be incremented if the front-facing polygon passes the z-test and the stencil buffer value would be decremented if the back-facing polygon passes the z-test. Thus, if the final stencil value is zero, the pixel is not in a shadow.

Referring now to FIG. 3, the stencil shadow volume method may begin by clearing the stencil buffer 40 and rendering the scene with diffuse colors 42. This rendering provides data for the color buffer and the depth buffer 43, also referred to as the z-buffer. The z-buffer and color buffer updates are turned off 44 except for the stencil value that may reside in the z-buffer. For each light, the shadow volume is generated for each occluder and the front-facing polygons of the shadow volume are rendered 46. The stencil buffer value is incremented 47 for each pixel on which a front-facing polygon is drawn. The same operation is performed with the back-facing polygons 48, except the stencil buffer value is decremented 49 for each pixel on which a back-facing polygon is drawn. The pass where the stencil value is incremented and decremented is referred to as the stencil shadow volume pass. Objects in the shadow will be those having a non-zero stencil value 50 and are rendered accordingly. Objects not in the shadow will have a stencil value 50 of zero and are rendered with specular color 52. The pass where the pixels outside a shadow are rendered with specular color is referred to as the specular color pass. Referring back to FIG. 1, once color information is computed by the pixel shader 22, the information is stored within the frame buffer 24.

Referring back to FIG. 2, for example, the stencil buffer value for pixel A 38 is incremented one time for the front-facing shadow volume polygon that would be rendered at the entry 33 and not decremented because there are no back-facing shadow volume polygons for pixel A 38. The non-zero value remaining in the stencil buffer for pixel A 38 indicates that pixel A 38 is in a shadow. Similarly, the stencil buffer value for pixel B 39 is incremented one time for the front-facing shadow volume polygon that would be rendered at the entry 33 and decremented one time for the back-facing shadow volume polygon that would be rendered at the exit 37. Since the stencil buffer value is zero, pixel B 39 is not in a shadow and would be rendered with specular color. Although the example in FIG. 2 has a single occluder and a single light source, the stencil shadow volume approach works for multiple shadows created by multiple occluders and multiple light sources.

Although computer graphics presently implement a compressed depth buffer (sometimes referred to as "ZL1"), to reduce the memory read traffic for the z-buffer, the current solution cannot perform the stencil operation very efficiently. This is especially true when the ZL1 tile (subtile) is accepted after a z-compare function. Since the stencil operation will happen even if the subtile passes the z-test, ZL1 has to change the subtile from the ACCEPT state to the RETEST state and pass it down to the z-buffer (sometimes referred to as "ZL2"). Currently the z-buffer and the stencil buffer (sometimes referred to as "SL2") may be combined such that the format of the ZL2/SL2 buffer is thirty-two bits having a twenty-four bit z-value and eight bits of stencil value. In the ACCEPT state, the entire thirty-two bit z/stencil value has to be read just to use the eight bit stencil value. This results in significant inefficiencies in terms of memory bandwidth.

Although the foregoing has only briefly summarized the operation of the various processing components and techniques for generating shadows, persons skilled in the art recognize that processing the graphics data is quite intense. Consequently, it is desired to improve processing efficiency wherever possible.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

One embodiment of the present invention is directed to an apparatus configured to perform shadow rendering, the apparatus for use in a computer graphics system comprising multiple depth buffers and multiple stencil buffers, where there are compressed and uncompressed depth and stencil buffers. The apparatus may further comprise caches for generating and communicating data among the compressed buffers and among the uncompressed buffers, and may further comprise logic for controlling the depth and stencil buffers.

Another embodiment of the present invention is directed to a graphics system comprising logic for generating compressed depth data corresponding to a group of pixels. As is known to one skilled in the art, a group of pixels may comprise a single tile, a subtile, or more than a tile. The graphics system further comprises logic for generating compressed stencil shadow data corresponding to a tile of pixels, such that the data is generated using a stencil shadow volume method.

Other embodiments of the present invention are directed to methods for generating a shadow effect in a computer graphics system. In this regard, one embodiment of such a method, among others, performs the stencil shadow volume method using a compressed stencil buffer where the compressed stencil buffer shares a cache with a compressed depth buffer.

Yet another embodiment of the present invention provides a means for creating a shadow effect using a compressed stencil buffer; further comprising a means for selectively merging the compressed stencil shadow data into a pixel stencil buffer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The accompanying drawings incorporated in and forming a part of the specification illustrate several aspects of the present invention, and together with the description serve to explain the principles of the invention. Moreover, in the drawings, like reference numerals designate corresponding parts throughout the several views. In the drawings.

DETAILED DESCRIPTION

Figure 1:
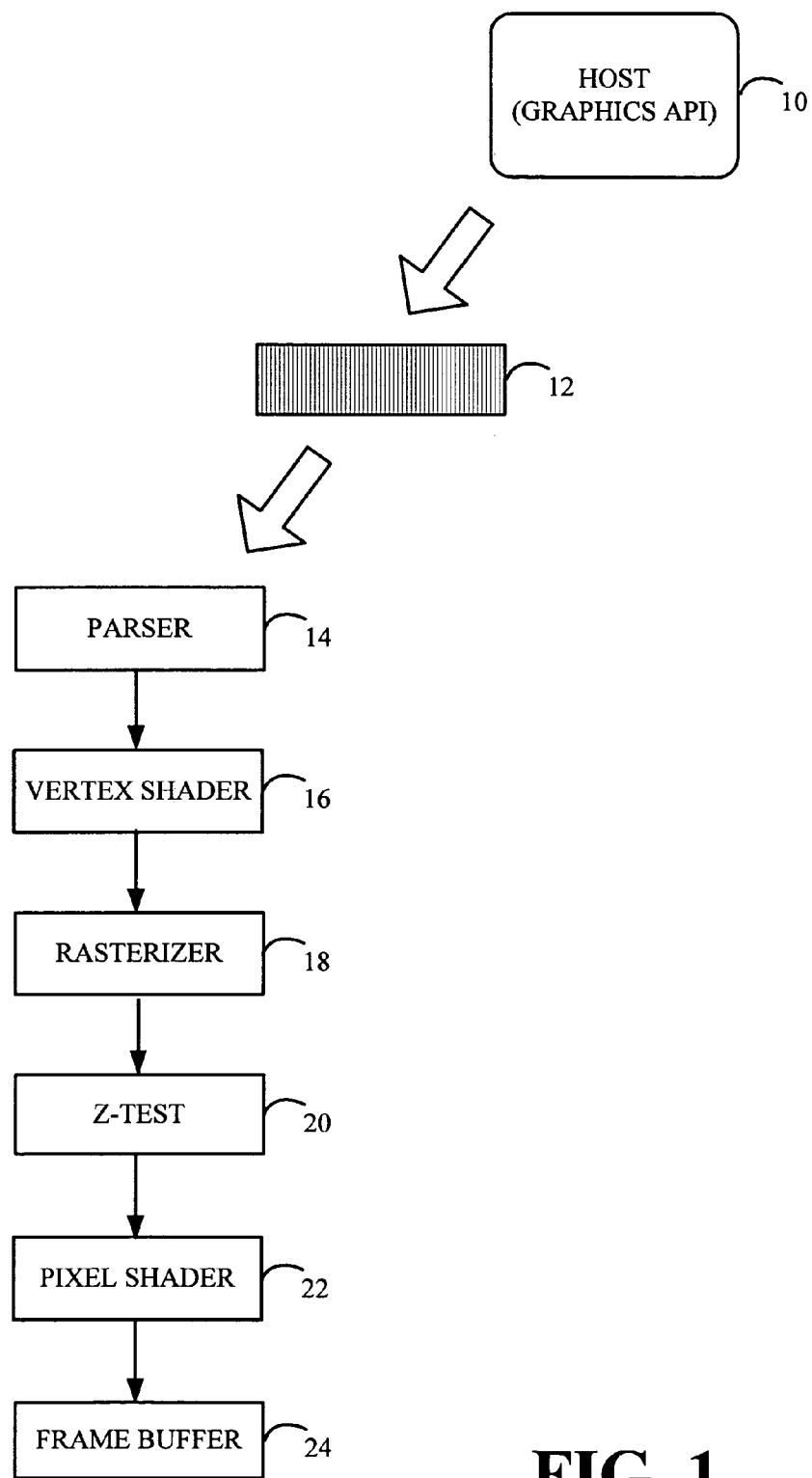
FIG. 1 is a block diagram of a conventional graphics pipeline, as is known in the prior art.
Figure 2:
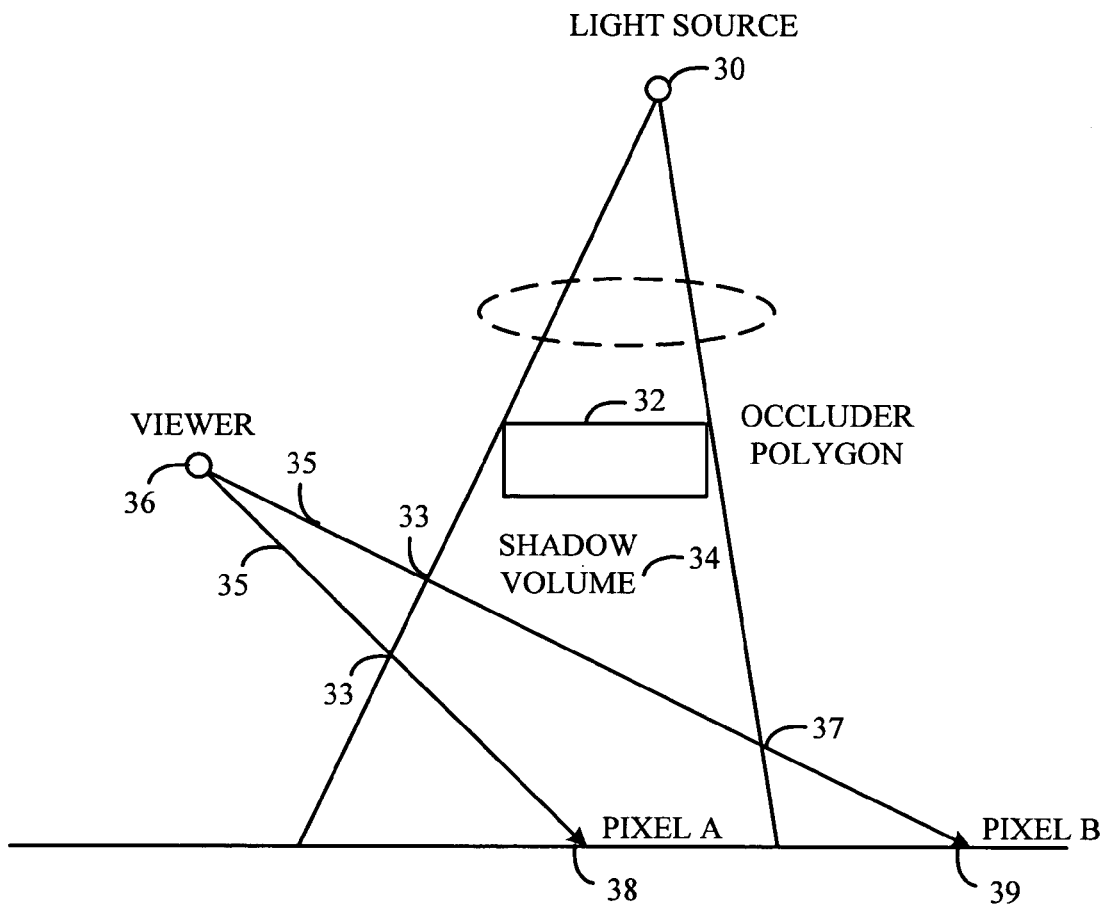
FIG. 2 is a two-dimensional representation of shadow volumes, as is known in the prior art.
Figure 3:
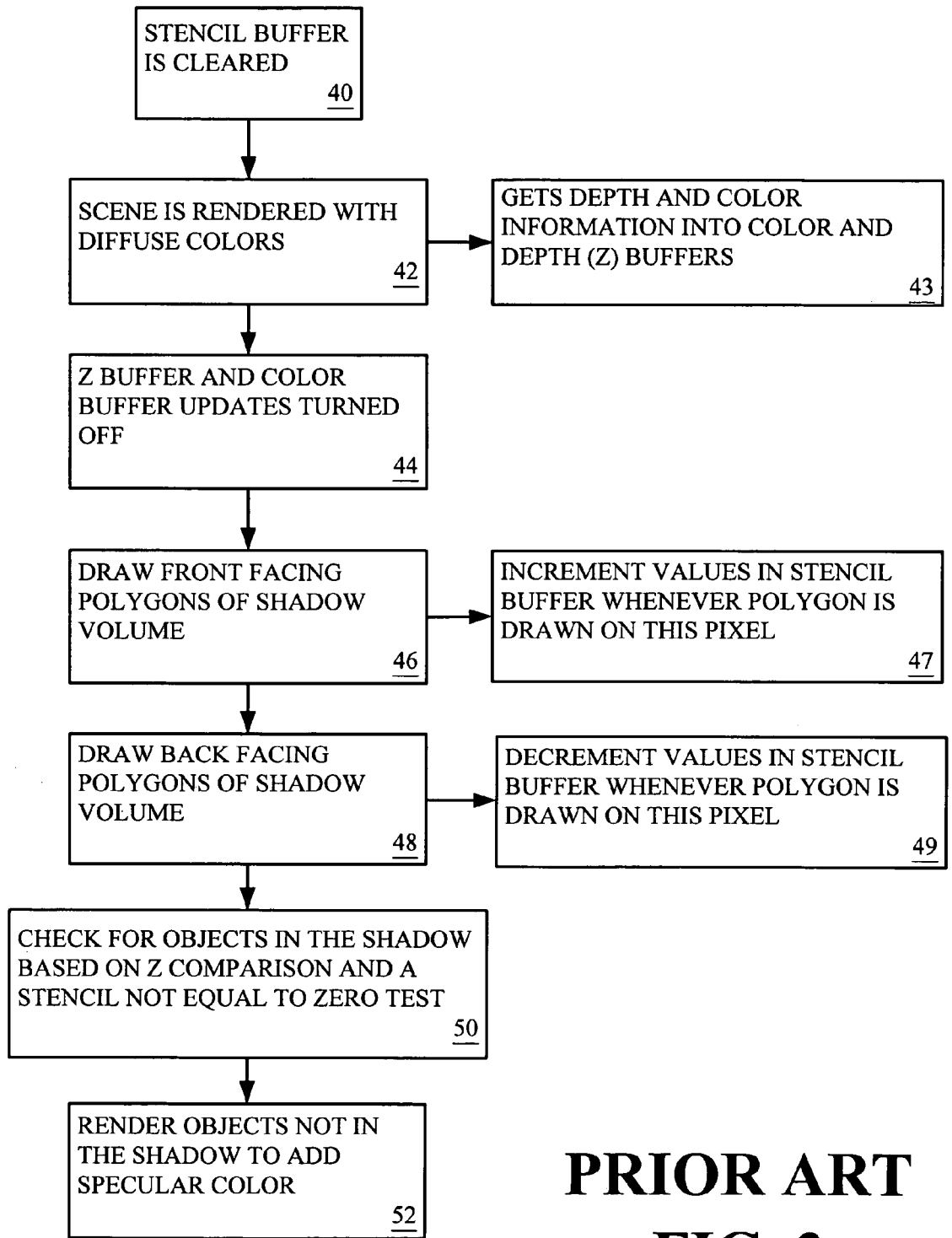
FIG. 3 is a block diagram illustrating the stencil shadow volume method, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

As summarized above, the present application is directed to embodiments of apparatus, systems and methods of generating a shadow effect in a computer graphics system through the use of the hardware feature of a compressed stencil buffer (sometimes referred to as "SL1") similar to the compressed depth buffer, ZL1.

Figure 4:
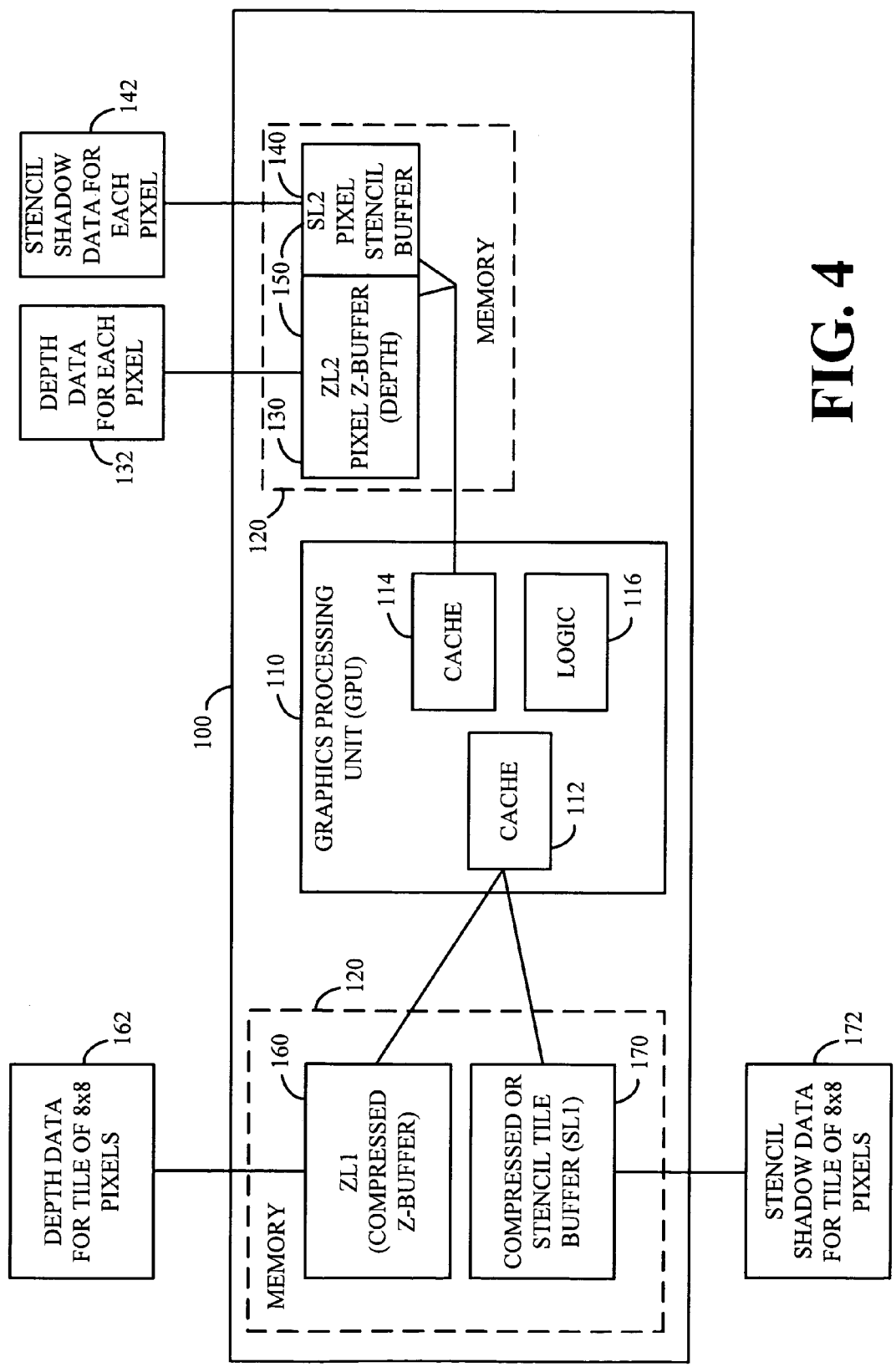
FIG. 4 is block diagram illustrating certain elements of a graphics component constructed in accordance with one embodiment of the invention.

Reference is made briefly to FIG. 4, which illustrates certain basic components of an embodiment of the invention. As illustrated, the computer graphics hardware 100 may contain a graphics processing unit 110 and memory 120. The memory 120 may include specific allocations for a z-buffer, ZL2 130, and a stencil buffer, SL2 140. The ZL2 130 and SL2 140 data structures may also be combined into a single buffer 150 where, for example, the data record is thirty-two bits with twenty-four bits for the z-value 132 and eight bits for the stencil value 142. As is known, the ZL2/SL2 buffer 150 stores a record for each pixel.

The memory 120 may also include an allocation for a compressed z-buffer, ZL1 160, which for example, stores the z-data 162 for a tile of pixels. Additionally, the memory 120 may include a compressed stencil buffer, SL1 170 which, for example, stores the stencil value 172 for a tile of pixels. As is known, a tile of pixels can be eight-by-eight pixels, eight-by-sixteen pixels or other dimensions determined to produce a desired level of performance.

The graphics processing unit 110 may also include a cache 112, shared by ZL1 and SL1, configurable to allocate a portion of the cache 112 to store ZL1 or SL1 records. The graphics processing unit 110 may also include a cache 114, configurable to allocate a portion to store the ZL2/SL2 records. The caches 112, 114 are respectively referred to as ZL1/SL1 cache and ZL2/SL2 cache. The graphics processing unit 110 may further include logic 116 for controlling ZL1 160, SL1 170, ZL2 130 and SL2 140 in, for example, the stencil shadow volume operation. The logic 116 may also be configured to perform compression of depth data and stencil shadow data. The logic 116 may further be configured to generate uncompressed stencil shadow data 142. Additionally, the logic 116 may be configured to selectively merge compressed stencil shadow data 172 and uncompressed stencil shadow data 142 associated with SL1 170 and SL2 140.

Figure 5:
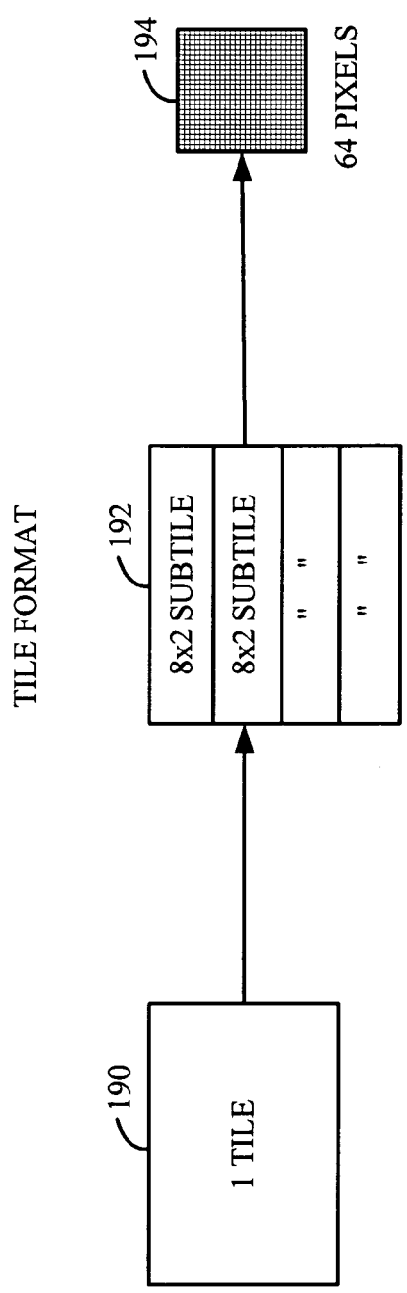
FIG. 5 is a representation illustrating a tile format used in one embodiment of the present invention.

Reference is now made to FIG. 5, illustrating an example of a tile arrangement. In one embodiment of the invention, the tile 190 is comprised of sixty-four pixels 194 configured, for example, in an eight-by-eight arrangement. The tile 190 may also be divided into four subtiles 192, where, for example, each subtile is eight-by-two pixels.

Figure 6:
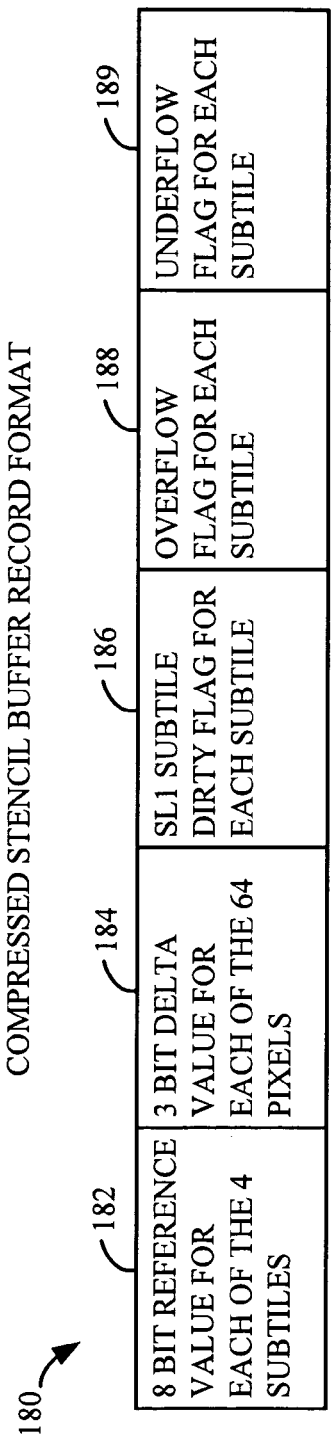
FIG. 6 is a block diagram illustrating the compressed stencil buffer data format of one embodiment of the invention.

An example of a data record format for SL1 is illustrated in FIG. 6. In this embodiment, the stencil data in SL1 170 comprises a record 180 for each tile 190 and corresponds to the tiles 190 in ZL1 160. FIG. 6 illustrates an example of a data record 180 format for an eight-by-eight tile 190 having four eight-by-two subtiles 192. The record 180 includes an eight bit reference value 182 for each of the four subtiles 192; a three bit delta value 184 for each of the sixty-four pixels; one SL1 subtile dirty flag 186 for each of the four subtiles 192; one overflow flag 188 for each of the four subtiles 192; and one underflow flag 189 for each of the four subtiles 192.

Figure 7:
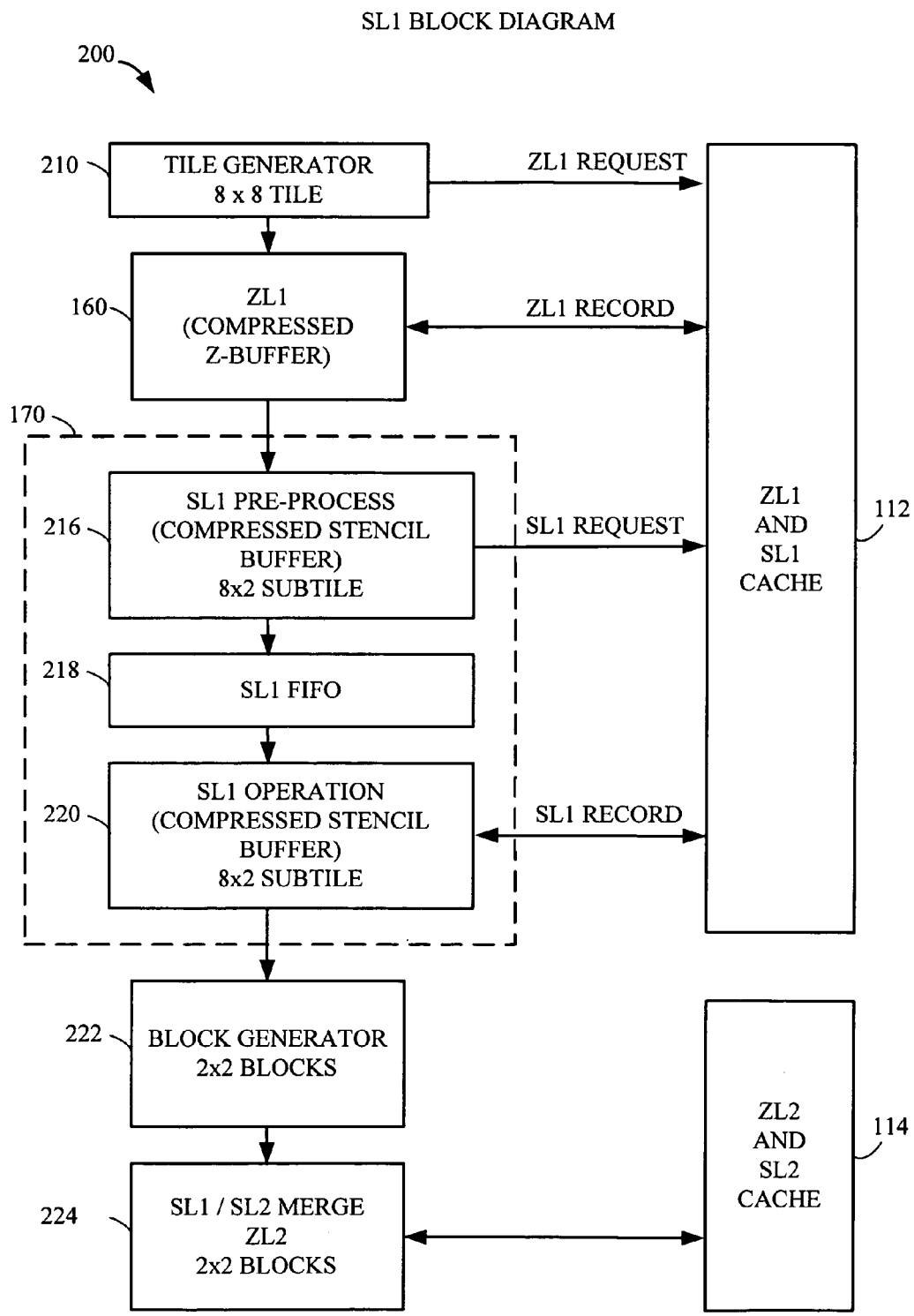
FIG. 7 is a block diagram illustrating the compressed stencil shadow buffer operation for one embodiment of the invention.

Reference is now made to FIG. 7, which illustrates the implementation of one embodiment of the present invention, described hereinafter. It should be appreciated that implementation of a compressed stencil buffer, SL1 170, in a stencil shadow volume approach may be accomplished in many different ways and this description merely represents one embodiment of the present invention.

After the tile generator 210 groups the pixels into eight-by-eight tiles, the z-values are compressed and the compressed z-data is stored in ZL1. The compressed z-data is then pre-processed 216 for SL1 to determine which subtiles should be processed in the stencil operation. For example, as discussed in detail below, any subtile in ZL1 that has an ACCEPT status requires an SL1 record. A hit test is performed on the ZL1/SL1 cache 112 and the SL1 entry is put into a deep FIFO 218 in order to compensate for the memory access latency. The SL1 record operation 220 includes the increment/decrement function associated with the stencil shadow volume operation, as discussed above. Additionally, the SL1 record operation 220 includes setting status flags, as mentioned above. These functions will be discussed in greater detail below.

After the SL1 record operation, a block generator 222 creates, for example, two-by-two blocks of pixel stencil data for the ZL2/SL2. Based on the state of status flags, the SL1 stencil data is selectively merged 224 into ZL2/SL2.

Figure 8:
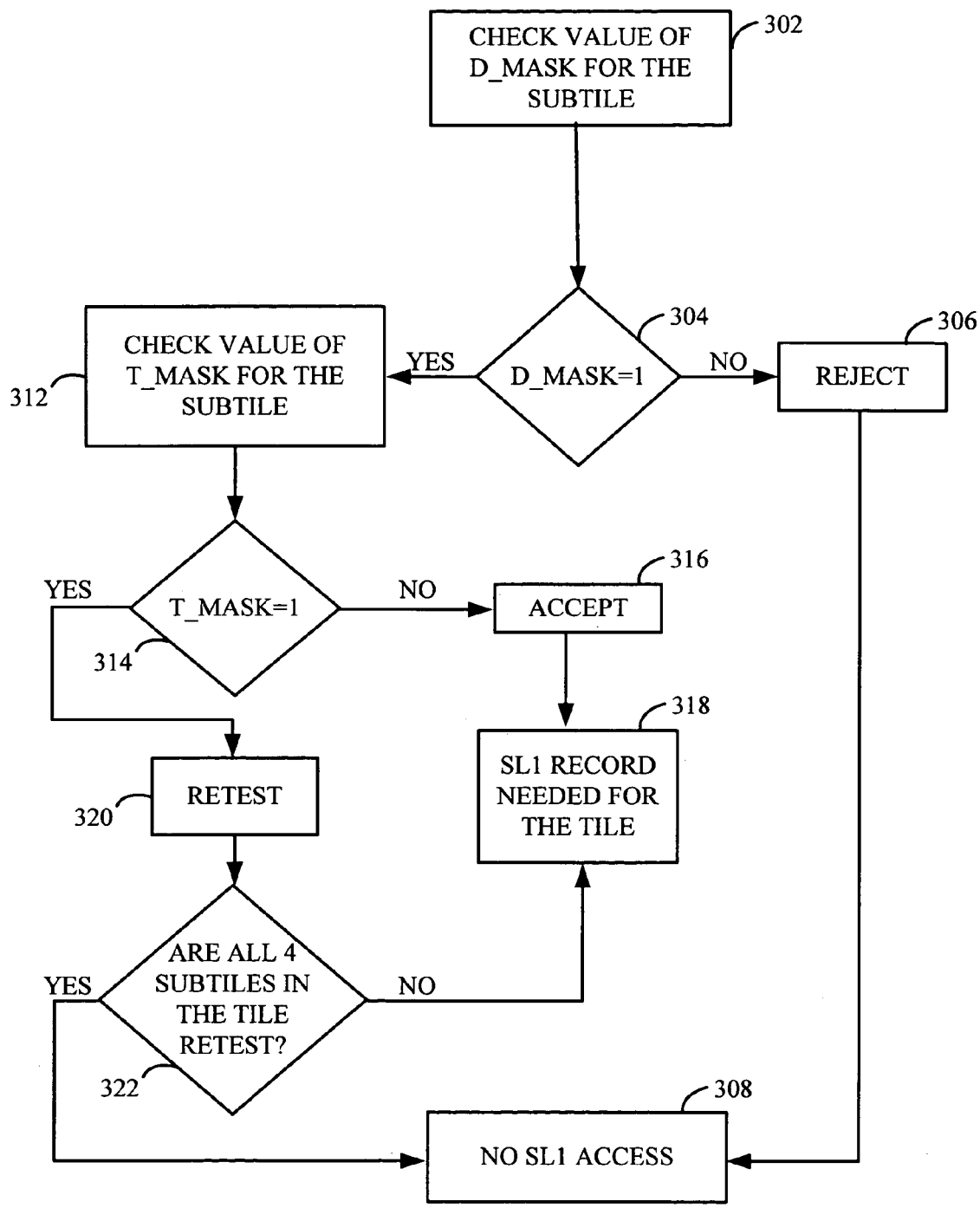
FIG. 8 is a block diagram illustrating one embodiment of the compressed stencil buffer pre-process operation in the present invention.

Reference is now made to FIG. 8, which illustrates the SL1 pre-process 216 in one embodiment of the present invention. The first step in the SL1 pre-process 216 is to check the value of a D_Mask bit for the subtile 302. The D_Mask is a bit in the ZL1 record and indicates whether the subtile should be drawn. If the value of the D_Mask is zero then the state of the subtile is REJECT 306 and the subtile does not require SL1 access 308.

If, in the alternative, the D_Mask for the subtile has a value of one, the value of a T_Mask for the subtile, also in the ZL1 record, is checked 312. The T_Mask is a bit in the ZL1 record and indicates whether the subtile should be retested. If the T_Mask for the subtile has a value of zero then the state of the subtile is ACCEPT 316 and an SL1 record is needed for the tile 318. If the T_Mask value for the subtile is one then the state of the subtile is RETEST 320. If all four subtiles in a tile have the RETEST status 322, then the subtile does not require SL1 access 308. If any of the four subtiles in the tile are ACCEPT then an SL1 record is needed for the tile 318.

Figure 9:
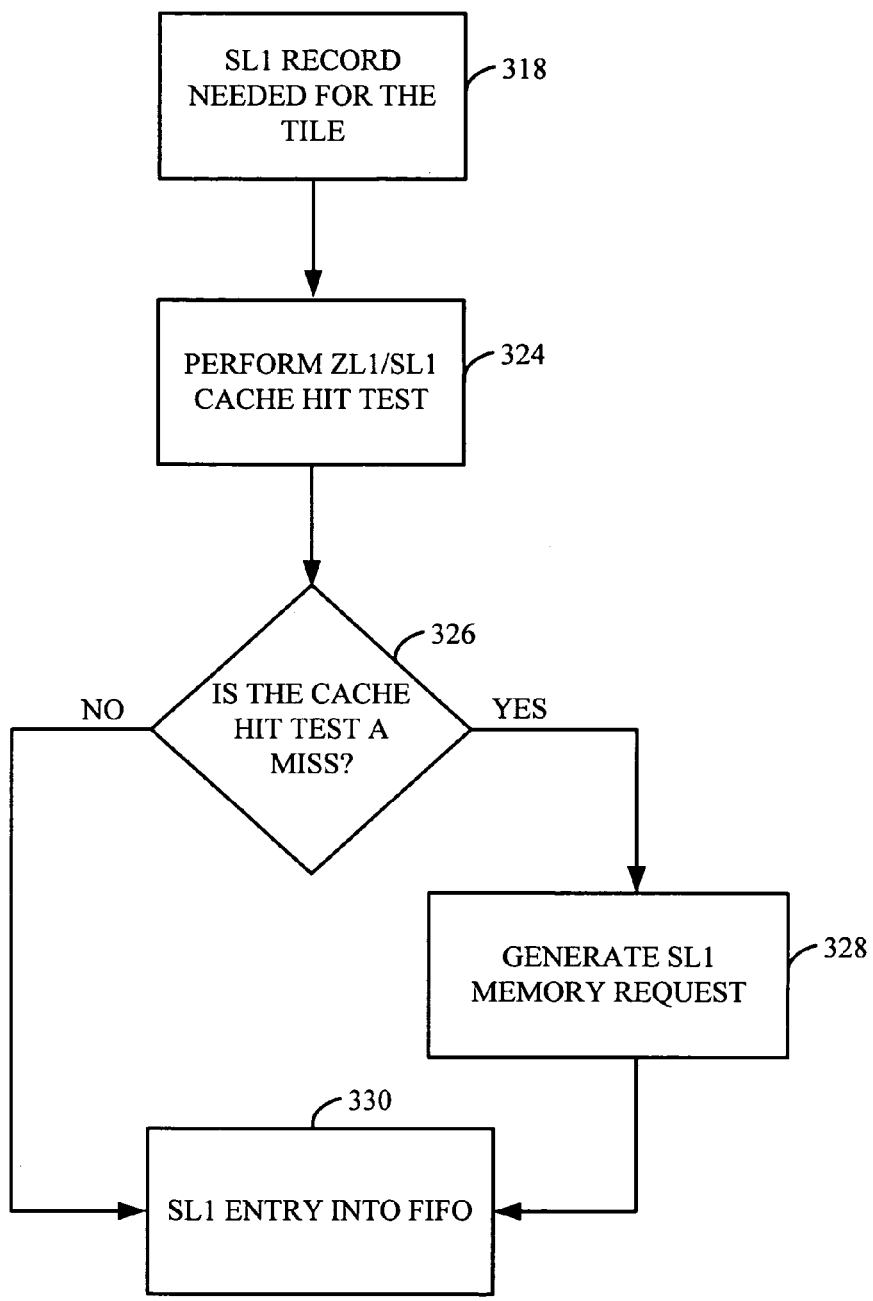
FIG. 9 is a block diagram illustrating an example process sequence where an SL1 record is necessary.

Reference is now made to FIG. 9, which illustrates a process where an SL1 record is required for the tile 318. Where the SL1 record is needed 318, the next step is to perform a ZL1/SL1 cache hit test 324. If the test result is a hit then the cache information for the SL1 record is moved into a deep FIFO 330. If the test result is a miss, then an SL1 memory request is generated 328 and the cache information for the SL1 record is moved into the deep FIFO 330. The SL1 FIFO 330 is deep, sixty-four levels for example, to compensate for SL1 memory request latency. The SL1 FIFO 330 stores the SL1 tile information including the ZL1/SL1 cache address as generated by the SL1 pre-process 216.

Figure 10:
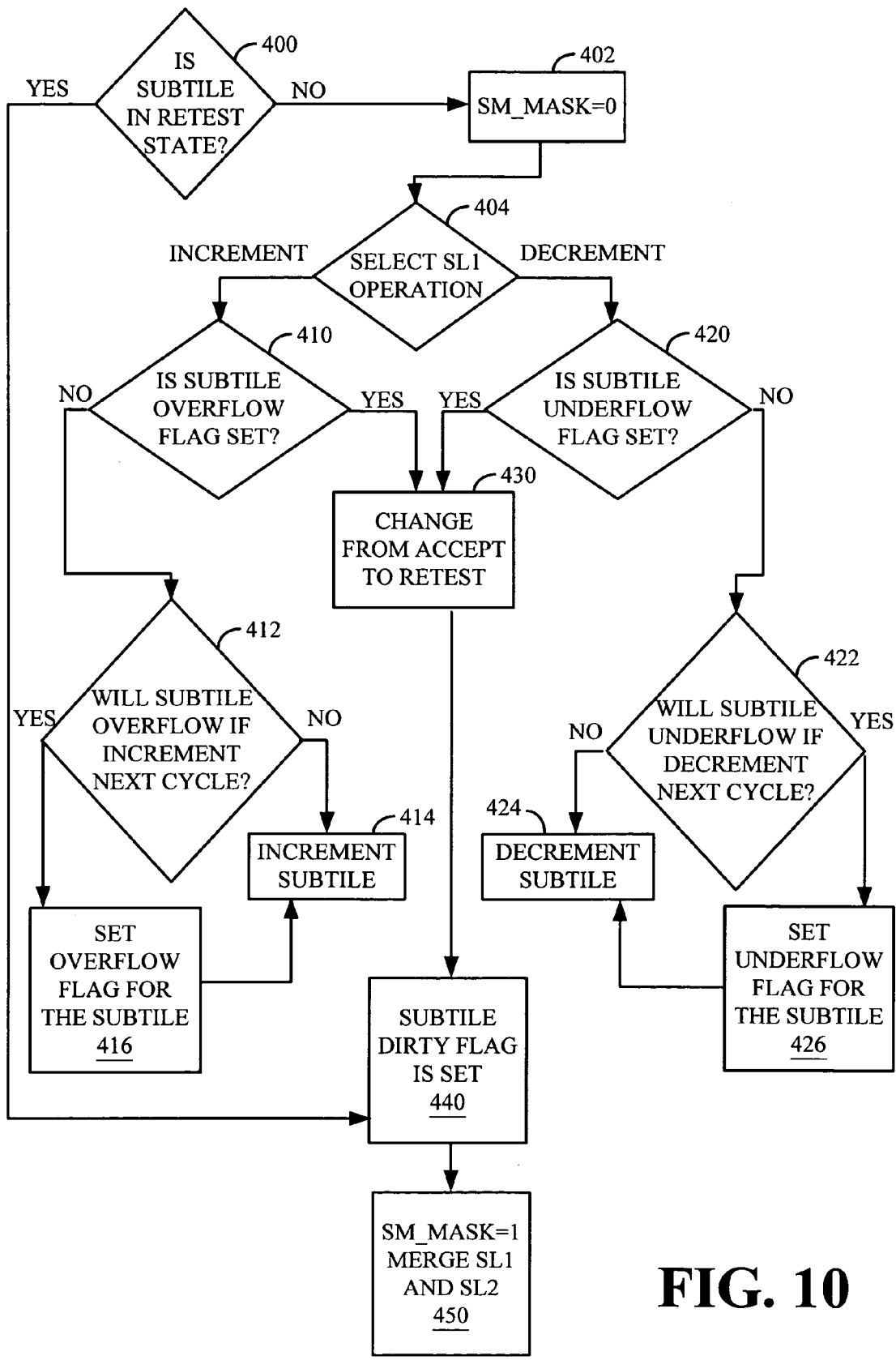
FIG. 10 is a block diagram illustrating one embodiment of the compressed stencil buffer record operation.

Reference is now made to FIG. 10, which illustrates one embodiment of the SL1 record operation. If the subtile is in a RETEST state 400, the subtile dirty flag is set 440, a SM_Mask is set to one 450 and the SL1 data is merged into the SL2 data. The SM_Mask is an extra mask added by the output of SL1 to indicate if the merge of SL1 and SL2 is enabled. If the subtile is not in a RETEST state, then the SM_Mask is set to zero 402 and the SL1 operation is performed. The basic operation of the SL1 record is the increment/decrement operation, as discussed above. Since the face of the triangle selects 404 the operation, the face of the primitive also has to pass to this unit. In addition to the increment/decrement operation, the SL1 record operation will generate the status flags to be stored in the SL1 record. These flags include the overflow, underflow and subtile dirty flags. The SL1 record operation may, for example, generate an overflow flag during an increment operation or generate an underflow during a decrement operation. The increment operation first checks the status of the overflow flag 410. If the overflow flag is not set, but the subtile will overflow if the operation is an increment, the overflow flag is set 416 and then the subtile is incremented 414. Otherwise, if the overflow flag is set then the subtile state is changed from ACCEPT to RETEST 430.

In the case of the decrement operation the status of the underflow flag is checked 420. If the underflow flag is not set, but the subtile will underflow if the operation is a decrement 422, then the underflow flag is set 426 and the subtile is decremented 424. Accordingly, if the underflow flag is set 420 at the beginning of the decrement operation, the subtile state is changed from ACCEPT to RETEST 430. Alternatively, if the subtile is not near an overflow or underflow condition during the corresponding increment/decrement operation, the subtile reference value is incremented or decremented. If the state of the subtile is changed from ACCEPT to RETEST 430, the subtile dirty flag is set 440 and the SM_Mask is set to one 450, which results in a merge between the SL1 and SL2 data for that subtile.

Figure 11:
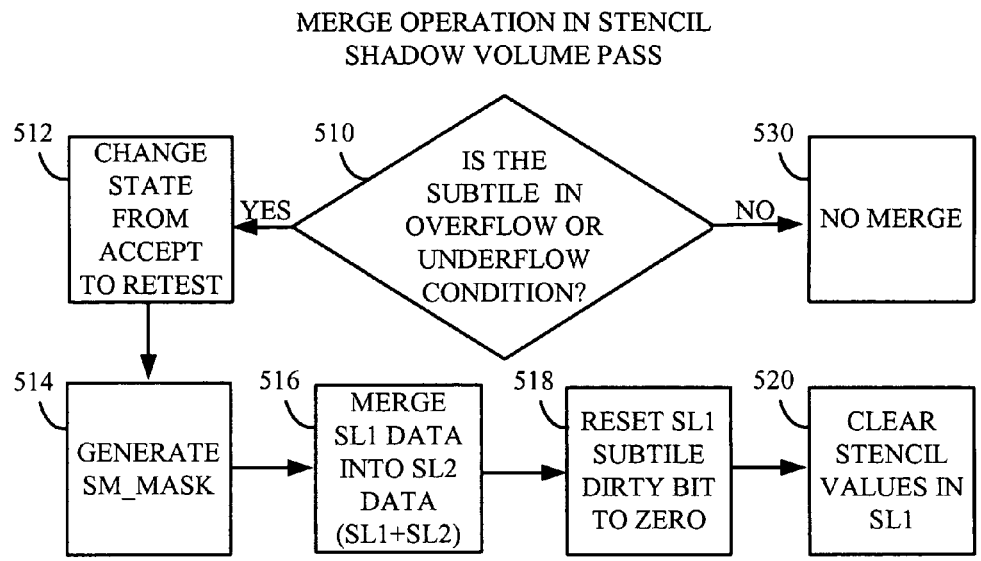
FIG. 11 is a block diagram illustrating a merge operation in the stencil shadow volume pass.

As discussed above, when the subtile dirty flag is set in SL1, the SL1 data is merged into SL2. The merge operation addresses the situation where the final stencil value is distributed in both SL1 and SL2. The merge operation can either happen in the stencil shadow volume pass or the specular color pass. In the stencil shadow volume pass, as illustrated in FIG. 11, the subtile may be in the condition of overflow or underflow 510. When this occurs, the state of the subtile will be converted from ACCEPT to RETEST 512. Additionally, the SM_Mask is generated 514 to merge the data from SL1 into SL2. The final value, which is the sum of SL1+SL2, is written into SL2 516. After the data is merged to SL2, the SL1 subtile dirty bit is reset to zero 518 to indicate that the subtile is clean and the stencil value can be cleared 520. This dynamic merge can reduce the chance of overflow and underflow for each subtile.

Figure 12:
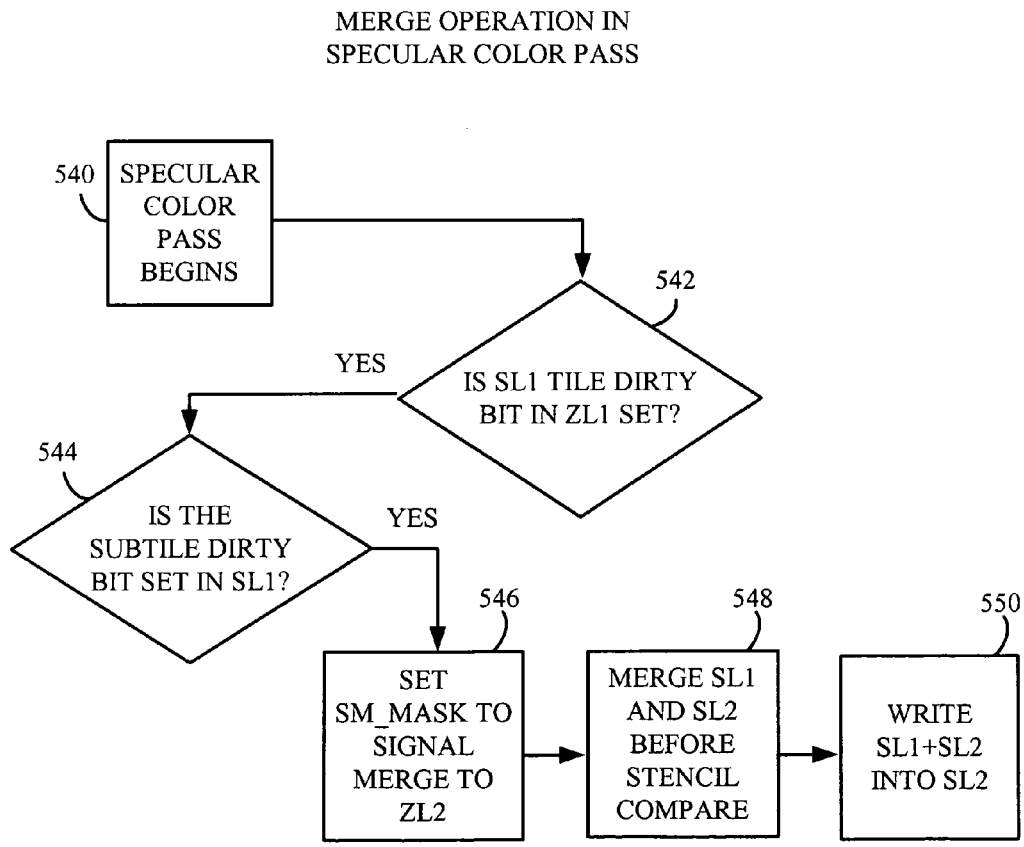
FIG. 12 is a block diagram illustrating a merge operation the specular color pass.

Reference is now made to FIG. 12. In the specular color pass, a bit in the ZL1 control register triggers the merge operation. This bit is set when the specular pass begins 540 and is based on the SL1 tile dirty bit in ZL1 542 and the subtile dirty bit in SL1 544. The SM_Mask 546 is set to signal ZL2 to merge SL1 and SL2 before the stencil compare 548 and then to write the sum back to SL2 550.

Figure 13:
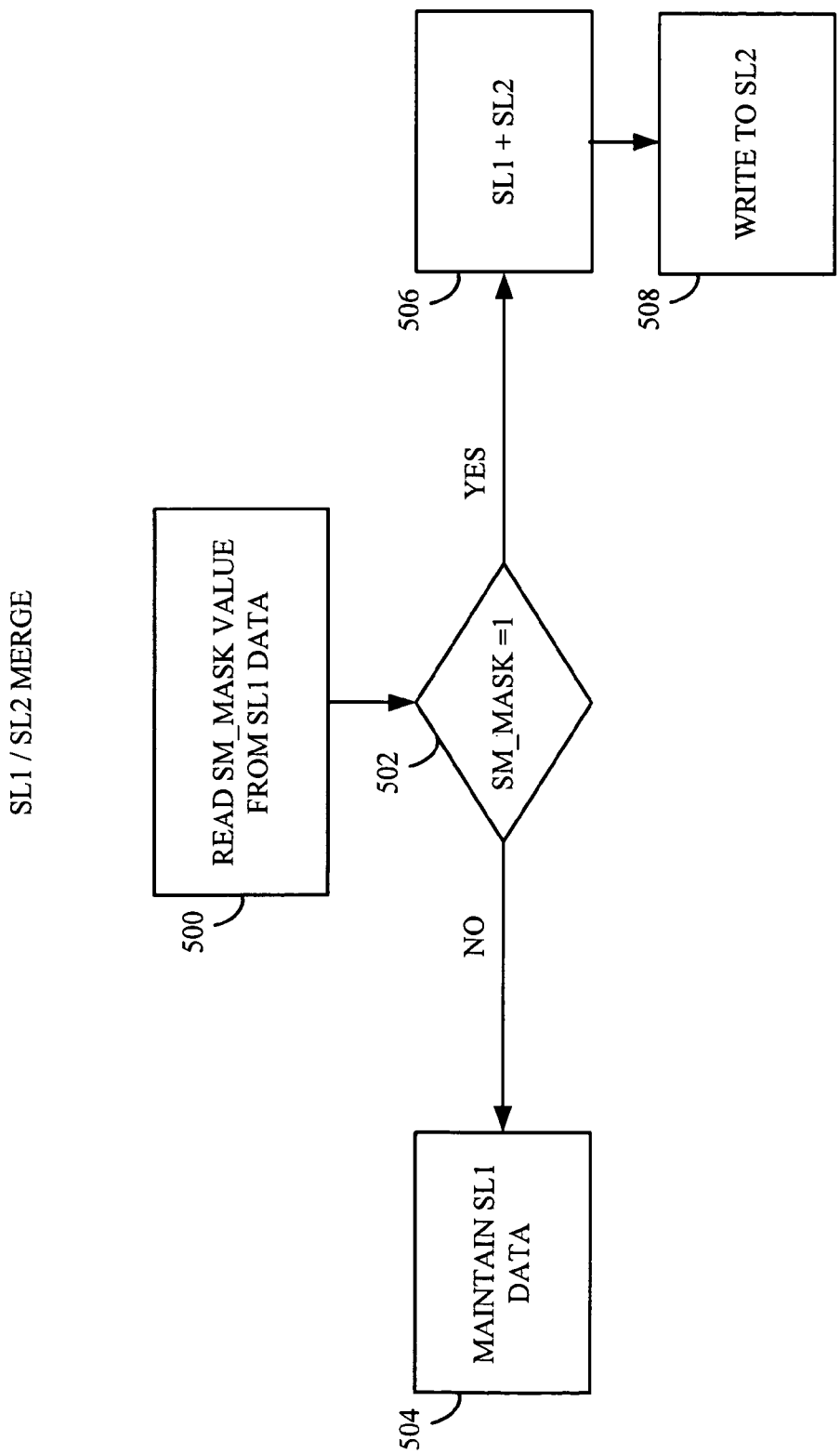
FIG. 13 is a block diagram illustrating one embodiment of the compressed stencil buffer merge operation.

The SL1/SL2 merge is signaled, as discussed above, by the SM_Mask bit being set for the subtile. Reference is now made to FIG. 13, which illustrates the general merge process. The SM_Mask value is read from SL1 500. In the case where the SM_Mask value is zero 502, no operations are performed on the LS1 data 504. Otherwise, where the SM_Mask value is one 502, the sum of the values in SL1 and SL2 is generated 506 and this final value is written to SL2 508.

Figure 14:
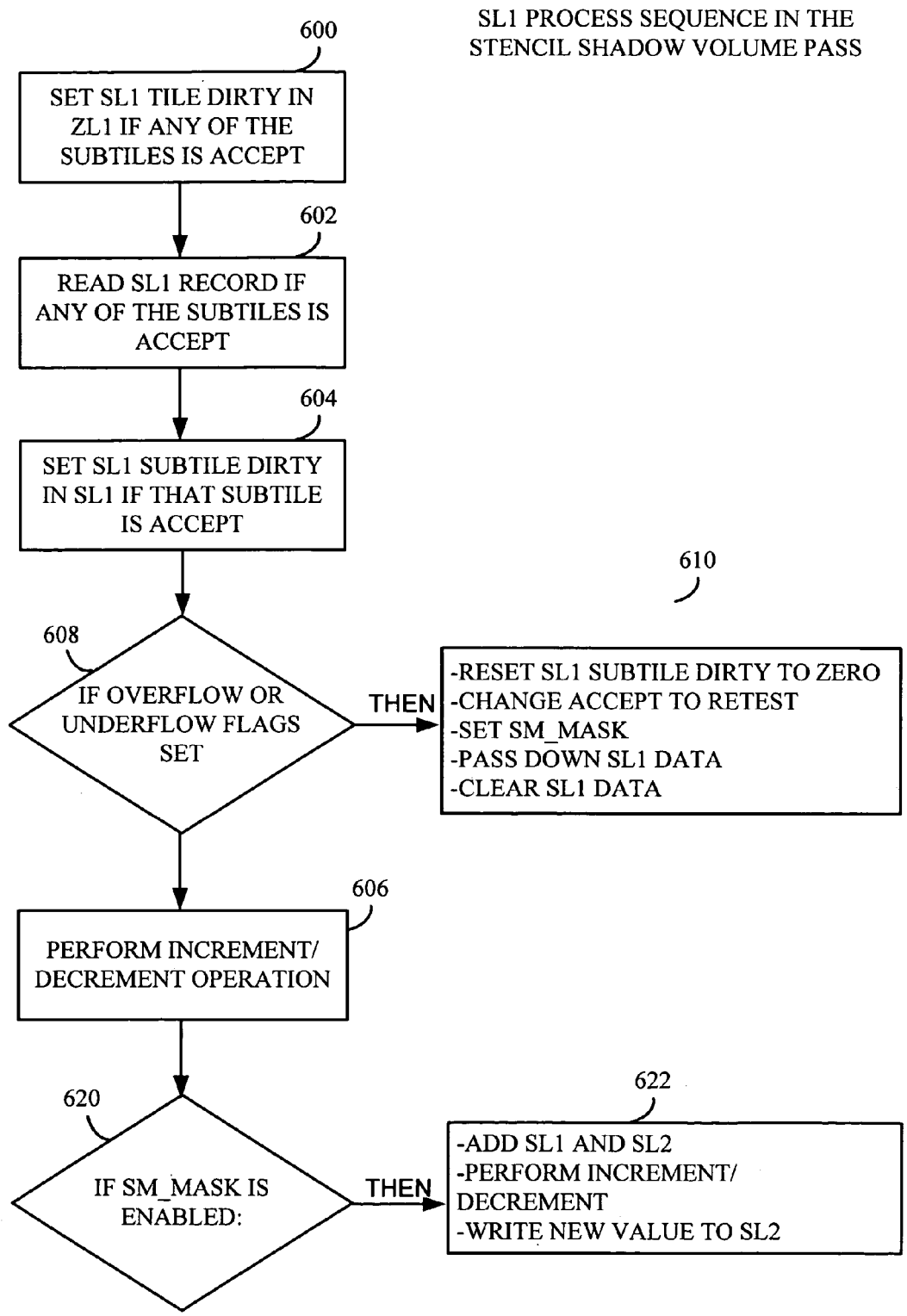
FIG. 14 is a block diagram illustrating the SL1 process sequence in the stencil shadow volume pass.

Reference is now made to FIG. 14, which illustrates the SL1 process sequence in the stencil shadow volume pass. The SL1 tile dirty bit in ZL1 is set if any of the subtiles has an ACCEPT state 600. The SL1 record is read for any of the subtiles that has an ACCEPT state 602 and the subtile dirty flag is set for that subtile in SL1 604. Before the stencil shadow volume increment/decrement operation is performed 606, the status of the overflow/underflow flags is checked 608. If the either of the overflow or underflow flags is set the SL1 subtile is reset to zero 610 and the state is changed from ACCEPT to RETEST 610. Additionally, the SM_Mask for that subtile is set 610 and the SL1 data is passed down 610. After the SL1 data is passed down, the SL1 data is cleared 610.

If the SM_Mask is enabled 620, the values from SL1 and SL2 are added 622 to reflect the final stencil value. Additional increment/decrement operations are performed 622 and the value is written to SL2 622.

Figure 15:
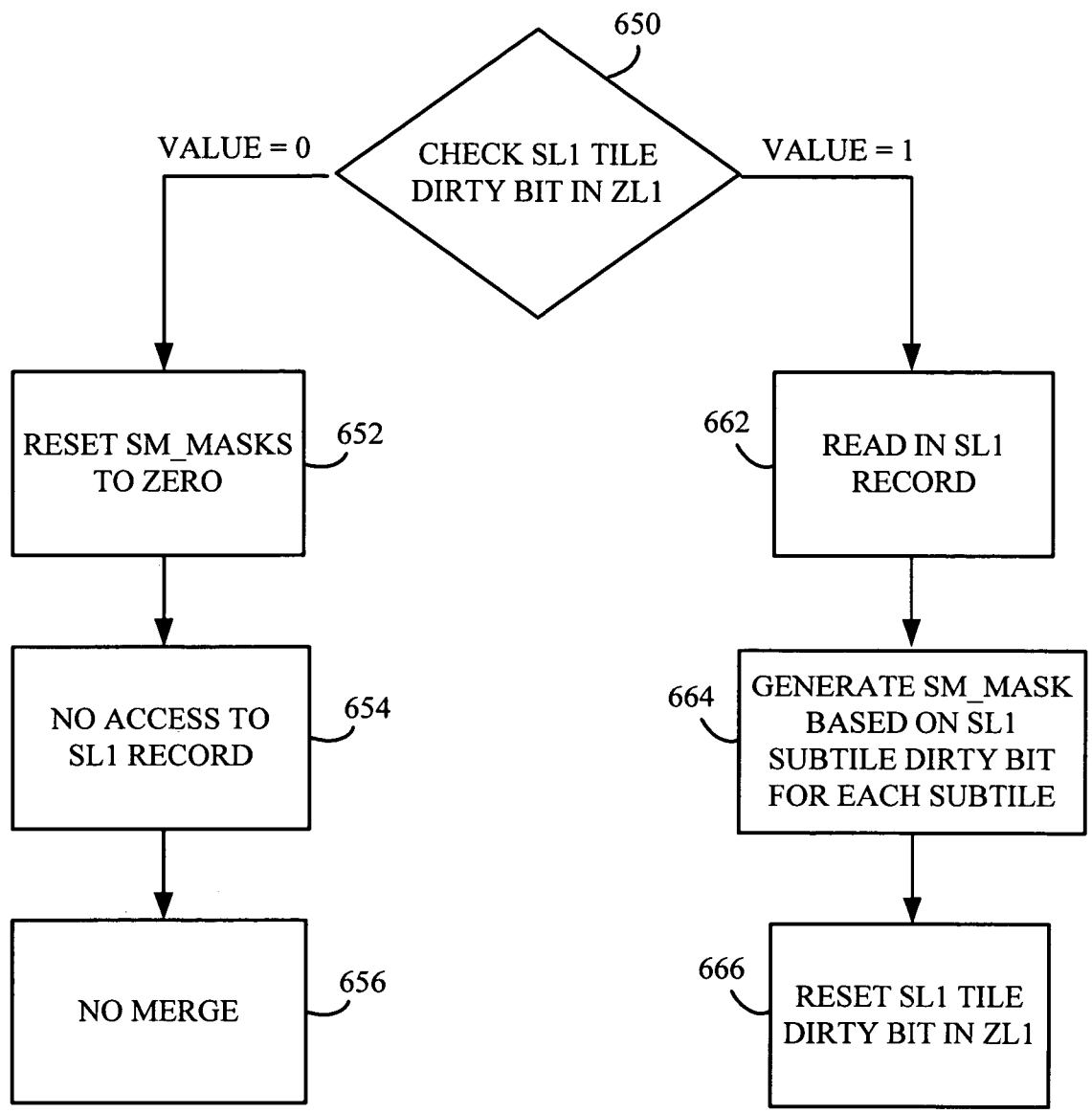
FIG. 15 is a block diagram illustrating the SL1 process sequence in the specular color pass.

Reference is now made to FIG. 15, which illustrates the SL1 process sequence in the specular color pass. If the value of SL1 tile dirty bit in ZL1 is zero 650 then the SM_Masks for the subtiles are reset to zero 652. In this case, no access to the SL1 record is necessary 654 and no merge is necessary 656. If the value of the SL1 tile dirty bit in ZL1 650 is one then the record from SL1 is read 662 and the SM_Mask is generated based on an SL1 subtile dirty bit for each subtile 664. The SL1 tile dirty bit in ZL1 is reset to zero 666 to ensure that the SL1 and SL2 merge only occurs one time.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. An apparatus for use in a computer graphics system, comprising:
    a plurality of depth buffers for storing depth data, wherein at least one of the plurality of depth buffers is configured to provide depth data for a group of pixels, wherein at least one other of the plurality of depth buffers is configured to provide depth data for each pixel of the group;
    a plurality of stencil buffers, the stencil buffers configured to store stencil shadow volume data, wherein at least one of the plurality of stencil buffers is configured to provide stencil shadow volume data for the group of pixels; wherein at least one other of the plurality of stencil buffers is configured to store stencil shadow volume data for each pixel of the group; and
    control logic for controlling the plurality of stencil buffers and the plurality of depth buffers, wherein the stencil shadow volume data is generated and stored.

2. The apparatus of claim 1, wherein the plurality of depth buffers comprise:
    a first depth buffer, wherein the first depth buffer has a plurality of first depth buffer records, such that each first depth buffer record stores depth data for a group of pixels, where the group of pixels comprises a tile; and
    a second depth buffer, wherein the second depth buffer has a plurality of second depth buffer records, wherein each second depth buffer record stores depth data for a pixel.

3. The apparatus of claim 2, wherein the plurality of the stencil buffers comprise:
    a first stencil buffer, wherein the first stencil buffer has a plurality of first stencil buffer records, such that each first stencil buffer record stores the stencil shadow volume data for the tile; and
    a second stencil buffer having a plurality of second stencil buffer records, such that each second stencil buffer record stores the stencil shadow volume data fur each pixel, wherein the second stencil buffer record is configured as a partition of the second depth buffer record.

4. The apparatus of claim 3, further comprising:
    a first cache, wherein the first cache is configured to communicate data with the first depth buffer; wherein the first cache is further configured to communicate data with the first stencil buffer; and
    a second cache, wherein the second cache is configured to communicate data with the second depth buffer, wherein the second cache is further configured to communicate data with the second stencil buffer.

5. The apparatus of claim 4, further comprising a plurality of subtiles, wherein each tile is divided into a plurality of subtiles, wherein the stencil shadow volume data stored in the first stencil buffer record comprises:
    a reference value for each of the plurality of subtiles;
    a delta value for each pixel comprised in the group of pixels; and
    a plurality of subtile status flags.

6. The apparatus of claim 5, further comprising a FIFO hardware structure, wherein the FIFO hardware structure is configured to store the first stencil buffer record.

7. The apparatus of claim 5, wherein the plurality of subtile status flags comprise a plurality of subtile dirty flags, a plurality of subtile overflow flags and a plurality of subtile underflow flags, wherein there is one of the plurality of subtile dirty flags corresponding to each one of the plurality of subtiles; wherein there is one of the plurality of subtile overflow flags corresponding to each one of the plurality of subtiles; wherein there is one of the plurality of subtile underflow flags corresponding to each one of the plurality of subtiles.

8. The apparatus of claim 4, wherein the plurality of stencil buffers resides within any of a plurality of hardware memory structures.

9. The apparatus of claim 4, wherein the plurality of depth buffers resides within any of a plurality of hardware memory structures.

10. The apparatus of claim 4, wherein the plurality of data caches is located on a computer graphics processor.

11. A method for generating a shadow effect in a computer graphics system, comprising the steps of:
   rendering an object with diffuse color;
   generating pixel depth information for a scene for storage in a pixel depth buffer;
   generating depth information for a group of pixels, wherein the depth information for the group of pixels is stored in a compressed depth buffer;
   testing the depth information in the compressed depth buffer to determine if the group of pixels may utilize a shadow mask data in a compressed stencil buffer;
   generating the shadow mask data; wherein a first portion of the shadow mask data is generated in the compressed stencil buffer, wherein a second portion of the shadow mask data is generated in a pixel stencil buffer;
   generating a shadow area, wherein the shadow area is determined by the shadow mask data contained in the compressed stencil buffer and the pixel stencil buffer; and
   adding specular color to objects not in the shadow area.

12. The method of claim 11, further comprising the step of:
   generating a shadow volume, wherein the shadow volume comprises a plurality of front-facing polygons relative to a viewpoint, wherein the shadow volume further comprises a plurality of back-facing polygons relative to the viewpoint.

13. The method of claim 12, further comprising the step of selectively incrementing a subtile reference value.

14. The method of claim 13, further comprising the step of selectively decrementing the subtile reference value.

15. The method of claim 14, wherein the group of pixels is a tile.

16. The method of claim 14, wherein the group of pixels is a subtile.

17. The method of claim 14, further comprising the step of setting a plurality of status flags in the compressed stencil buffer, wherein the plurality of status flags are set to indicate that a portion of the shadow mask data in the compressed stencil buffer is incomplete.

18. The method of claim 17, further comprising the step of selectively merging the shadow mask data in the compressed stencil buffer into the pixel stencil buffer; wherein the states of the plurality of status flags are utilized to select which shadow mask data from the compressed stencil buffer is merged into the pixel stencil buffer.

19. A computer graphics system comprising:
   depth data compression logic configured to generate a compressed depth data, where the compressed depth data corresponds to a group of pixels;
   shadow data compression logic configured to generate a compressed stencil shadow data, where the compressed stencil shadow data corresponds to the group of pixels, wherein the compressed stencil shadow data is generated utilizing a stencil shadow volume method;
   shadow data generation loge configured to generate an uncompressed stencil shadow data, wherein the uncompressed stencil shadow data is generated utilizing the stencil shadow volume method; and
   shadow data merging logic configured to selectively merge the compressed stencil shadow data with the uncompressed stencil shadow volume data.

20. The shadow data generation logic of claim 19, further configured to selectively generate the uncompressed stencil shadow data, wherein the uncompressed data is selectively generated based on the compressed stencil shadow data exceeding a range, wherein the range is determined by a format of the compressed stencil shadow data.

21. The shadow data merging logic of claim 20, further configured to selectively merge the compressed stencil shadow data and the uncompressed stencil shadow data, wherein the merge operation is determined by the state of a plurality of data status flags.

22. The shadow data merging logic of claim 21, wherein one of the plurality of data status flags comprises a subtile underflow flag.

23. The shadow data merging logic of claim 21, wherein one of the plurality of data status flags comprises a subtile overflow flag.

24. The shadow data merging logic of claim 21, wherein one of the plurality of data status flags comprises a subtile dirty flag.

25. The computer graphics system of claim 19 further, comprising a means for creating a shadow effect using a compressed stencil buffer.

26. The computer graphics system of claim 25, further comprising:
   means for selectively merging shadow mask data for a tile into a pixel stencil buffer, wherein the tile corresponds to a record in the compressed stencil buffer; wherein the tile is comprised of a group of pixels; wherein a subtile is comprised of a subset of the group of pixels.

27. The computer graphics system of claim 26, further comprising:
   means for storing a pixel depth data in a pixel depth data buffer; and
   means for storing a compressed depth data in a compressed depth data buffer, wherein the compressed depth data corresponds to the tile.

28. The computer graphics system of claim 27, further comprising a means for determining which pixels are in a shadow.

29. The computer graphics system of claim 28, wherein the means for determining which pixels are in a shadow comprises selectively performing a depth data test on compressed depth data and pixel depth data, wherein the means for determining which pixels are in a shadow further comprises selectively performing a stencil value not equal to zero test on pixel stencil data and compressed stencil data.

30. The computer graphics system of claim 29, further comprising a means for adding specular color to pixels not contained in the shadow.

* * * * *